United States Patent
Boldyrev et al.

(10) Patent No.: US 9,361,347 B2
(45) Date of Patent: Jun. 7, 2016

(54) METHOD, APPARATUS, AND COMPUTER PROGRAM PRODUCT FOR DETERMINING DATA SIGNATURES IN A DYNAMIC DISTRIBUTED DEVICE NETWORK

(75) Inventors: Sergey Boldyrev, Söderkulla (FI); Ian Justin Oliver, Söderkulla (FI); Jukka Honkola, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 2110 days.

(21) Appl. No.: 12/347,018

(22) Filed: Dec. 31, 2008

(65) Prior Publication Data

US 2010/0169345 A1    Jul. 1, 2010

(51) Int. Cl.
G06F 17/30    (2006.01)
G06F 17/10    (2006.01)

(52) U.S. Cl.
CPC .......... G06F 17/30575 (2013.01); G06F 17/10 (2013.01); G06F 17/30306 (2013.01); G06F 17/30569 (2013.01)

(58) Field of Classification Search
CPC .............. G06F 17/10; G06F 17/30306; G06F 17/30569; G06F 17/30575
See application file for complete search history.

(56) References Cited

U.S. PATENT DOCUMENTS

| | | | |
|---|---|---|---|
| 5,485,474 A | | 1/1996 | Rabin |
| 6,968,478 B1* | | 11/2005 | Edwards et al. ............. 714/32 |
| 7,076,061 B1* | | 7/2006 | Lenstra et al. ............. 380/44 |
| 8,149,773 B2* | | 4/2012 | Sambhwani et al. ......... 370/329 |
| 2004/0034628 A1* | | 2/2004 | Numao et al. ............. 707/3 |
| 2006/0026152 A1* | | 2/2006 | Zeng et al. ............. 707/5 |
| 2008/0147821 A1 | | 6/2008 | Dietrich et al. |
| 2009/0132474 A1* | | 5/2009 | Ma et al. ............. 707/2 |
| 2010/0169345 A1 | | 7/2010 | Boldyrev et al. |

FOREIGN PATENT DOCUMENTS

| | | |
|---|---|---|
| EP | 1 850 262 A2 | 10/2007 |
| EP | 2370900 A1 | 10/2011 |
| JP | 2005-071115 A | 3/2005 |

(Continued)

OTHER PUBLICATIONS

Boldyrev, S. et al.: Determining Information Signatures in Smart Spaces. In: Proceeding of the IEEE International Conference on Semantic Computing, Sep. 14, 2009 to Sep. 16, 2009, pp. 291-296; abstract; figure 2; section II; section III, B, 1st-4th paragraphs; section III, C.

(Continued)

*Primary Examiner* — Dinku Gebresenbet
(74) *Attorney, Agent, or Firm* — Ditthavong & Steiner, P.C.

(57) ABSTRACT

An apparatus for determining data signatures in a dynamic distributed device network may include a processor. The processor may be configured to receive a first query and generate a local partial closure of the data identified by the first query. The processor may be further configured to synthesize a data signature of the local partial closure. In this regard, the data signature may be an irreducible polynomial expression and the data signature may be orthogonal to remote data signatures generated from remote partial closures. Further, the processor may be configured to store the data signature in an information store within a dynamic distributed device network. Associated methods and computer program products may also be provided.

20 Claims, 3 Drawing Sheets

(56) References Cited

FOREIGN PATENT DOCUMENTS

JP          2007-299088 A       11/2007
WO          2010076370 A1        7/2010

OTHER PUBLICATIONS

International Search Report, PCT/FI2009/050732, Dec. 22, 2009.
Office Action for related Japanese Patent Application No. 2011-542852 dated Dec. 25, 2012, pp. 1-6.
Substantive Examination report for corresponding Indonesian Application No. W00 2011 02621, issued Sep. 20, 2013 (1 page).
Office Action for corresponding Japanese Application No. 2011-542852, issued Nov. 7, 2013 (6 pages).
Lassila: "Taking the RDF Model Theory Out for a Spin," *The Semantic Web—ISWC 2002, Lecture Notes in Computer Science* 2342, pp. 307-317, 2002.
Dubois et al., "Ordinal and probabilistic representations of acceptance," *J. Artificial Intelligence Research*, 22, pp. 23-56, Jul. 2004.
Dubois et al., "On the use of aggregation operations in information fusion processes," *Fuzzy Sets and Systems*. 142, pp. 143-161, 2004.
Ponomaryov, "A decomposability criterion for elementary theories," Siberian Mathematical Journal, vol. 49, No. 1, pp. 152-154, 2008.
Rabin, "Efficient Dispersal of Information for Security, Load Balancing, and Fault Tolerance," Journal of the ACM, vol. 36(2), pp. 335-348, Apr. 1989.
Shoup, "New algorithms for finding irreducible polynomials over finite fields," *Mathematics of Computation* 54:435-447, 1990; extended abstract in *Proc. 29th Annual Symposium on Foundations of Computer Science*, pp. 283-290, 1988.
Oliver et al., "Personal Semantic Web Through A Space Based Computing Environment," *In proceedings: Middleware for the Semantic Web, Seconds IEEE International Conference on Semantic Computing*, Aug. 4-7, 2008.
Rabin, "Probabilistic algorithms in finite fields," *SIAM Journal on Computing*, vol. 9, No. 2, pp. 273-280, Jan. 1979.
Berlekamp, "Factoring polynomials over large finite fields," *Mathematics of Computation*, vol. 24, pp. 713-735.
Shoup, "On the deterministic complexity of factoring polynomials over finite fields," *Computer Science Technical Report No. 782*, University of Wisconsin-Madison, Feb. 1989.
Ben-Or, "Probabilistic algorithms pp. 273-280, Jan. 1979 in finite fields," *SIAM Journal on Computing*, vol. 9, No. 2.
Office Action for Korean Patent Application No. 10-2011-7017846, dated Jan. 30, 2013, pp. 1-4.
Office Action with English Summary for Chinese Application No. 200980153241.7, dated Feb. 7, 2013, pp. 1-10.
Office Action for Canadian Patent Application No. 2,748,434, dated May 10, 2013, pp. 1-3.
Office Action for corresponding Canadian Application No. 2,748,434, dated Apr. 1, 2014, 4 pages.
Office Action for corresponding Chinese Application No. 200980153241.7, dated Dec. 3, 2013, Including English language Summary.
Office Action for corresponding Australian Patent Application No. 2009334741 dated May 6, 2015, 2 pages.
Office Action for corresponding Canadian Application No. 2748434 dated May 13, 2015, 3 pages.
Office Action for corresponding European Patent Application No. 09836117.3-1507, dated Jan. 4, 2016, 8 Pages.
Hendricks et al., "Verifying Distributed Erasure-Coded Data", PODC '07 Proceedings of the Twenty-Sixth Annual ACM Symposium on Principles of Distributed Computing, Aug. 12, 2007, 8 Pages.
Bailey et al., "Web and Semantic Web Query Languages: A Survey", Proceedings of the First International Conference on Reasoning Web, 2005, Vol. 3564, pp. 35-133.

\* cited by examiner

METHOD, APPARATUS, AND COMPUTER PROGRAM PRODUCT FOR DETERMINING DATA SIGNATURES IN A DYNAMIC DISTRIBUTED DEVICE NETWORK

TECHNICAL FIELD

Embodiments of the present invention relate generally to information storage and retrieval within a network, and, more particularly, relate to a method, apparatus, and a computer program product for determining data signatures in a dynamic distributed device network.

BACKGROUND

The modern communications era has brought about a tremendous expansion of wireless networks. Various types of networking technologies have been and are being developed resulting in unprecedented expansion of computer networks, television networks, telephony networks, and other communications networks. As new networking technologies evolve, consumer demand continues to fuel increased innovation with respect to utilization of networks. Wireless and mobile networking technologies continue to address related consumer demands, while providing more flexibility and immediacy of information transfer.

As the flexibility and functionality of mobile communications devices increases, options for networking technologies continue to evolve. For example, the technology associated with dynamic distributed device networks or dynamic architecture networks, such as smart spaces, are becoming increasingly practical due to the evolution of mobile communications devices.

A smart space may be an environment where a number of devices may use a shared view of resources and services to access information within the environment. In this regard, smart spaces can provide improved user experiences by allowing users to flexibly introduce new devices and access most or all of the information available in the multiple device environment from any of the devices within the environment.

However, information management and message routing in smart spaces can be complex since smart spaces do not have a static network topology. As a result, difficulties often arise regarding how to handle information present in the devices within a smart space, knowing that the devices and the associated information may not be accessible at any moment due to the device leaving the smart space.

To manage the unpredictable loss of information access, many conventional smart space networks employ dispersion algorithms. Dispersion algorithms can divide a data set into sub-units or partial closures and disperse the partial closures throughout the smart to various devices. According to many conventional solutions, the partial closures may be generated such that less than all of the partial closures are required to reconstruct the original data set. As such, no single point of access to the data set exists, and the risk of data loss is limited because less than all of the partial data closures can be used to reconstruct the whole.

While the use of dispersion algorithms and partial data closures can operate to solve some of the issues with smart space information management, the need to communicate and utilize partial data closures is still required. Due to the size, for example in bytes, of a partial data closure, the communication and utilization of partial data closures can burden the smart space network and reduce the efficiency of smart space by consuming bandwidth and adding traffic to communications channels within the smart space.

BRIEF SUMMARY

A method, apparatus, and computer program product are described that provide for determining data signatures to reduce the burden on smart space, and other dynamic distributed device networks with respect to the utilization of dispersed data. In this regard, example embodiments of the present invention transform or synthesize partial data closures, for example via cyclotomic polynomial extensions, into irreducible polynomial expressions or data signatures. The partial data closures may be local to a device within a dynamic distributed device network, and may be generated based on a received query. In some example embodiments, the data signatures represent smaller sized data packages, relative to partial data closures, that may be used to reproduce a full or deductive data closure through a process of combination and transformation. According to various example embodiments, the data signature may be dispersed within a smart space using a dispersion technique such as a uniform or skewed/non-uniform dispersion technique. Due to changes in a dynamic distributed device network and/or associated changes to data within the network, data signatures may be regularly or irregularly re-synthesized or updated to ensure that the data signatures accurately represent the data upon which the data signatures are based. The data signatures may be subsequently stored to facilitate use of the data signatures with respect to later queries.

Having dispersed and updated the data signatures, various example embodiments may receive a query. The query may also be transformed using, for example cyclotomic polynomial extensions, to generate a target signature. The target signature may then be used to locate, within a smart space or other dynamic distributed network, data signatures that satisfy the target signature. Two or more orthogonal data signatures may subsequently be combined to generate a deductive data signature. The deductive data signature may be representative of a full data closure of the data requested by the query. In some example embodiments, the deductive data signature may be transformed to generate the full data closure to satisfy the query.

An effect of some example embodiments of the invention is to reduce the burden on the communications infrastructure of a dynamic distributed device network with respect to utilization of the relatively smaller sized data signatures. Further, example embodiments optimize the balance between pre-emptive data processing with respect to a query (e.g., calculating data closures in advance) and the dynamic creation of full or deductive closures of data. Additionally, example embodiments of the present invention provide for tracking of the relevant pieces of data in a scalable solution. Energy efficiencies are also realized by example embodiments due to the reduced burden on communications infrastructure and the storage of data. Example embodiments are also device platform independent and allow for different device platforms to interact within the constraints of the solution.

An example embodiment of the present invention is an apparatus for determining data signatures. The example apparatus may include a processor, and the processor may be configured to receive a first query and generate a local partial closure of the data identified by the first query. The processor may be further configured to synthesize a data signature of the local partial closure. In this regard, the data signature may be an irreducible polynomial expression and the data signature may be orthogonal to remote data signatures generated from remote partial closures. Further, the processor may be configured to store the data signature in an information store within a dynamic distributed device network.

In another example embodiment of the present invention, a computer program product for determining data signatures is provided. The example computer program product includes at least one computer-readable storage medium having executable computer-readable program code instructions stored therein. The computer-readable program code instructions may be configured to receive a first query and generate a local partial closure of the data identified by the first query. The computer-readable program code instructions may be further configured to synthesize a data signature of the local partial closure. In this regard, the data signature may be an irreducible polynomial expression and the data signature may be orthogonal to remote data signatures generated from remote partial closures. Further, the computer-readable program code instructions may be configured to store the data signature in an information store within a dynamic distributed device network.

Yet another example embodiment of the present invention is a method for determining data signatures. The example method includes receiving a first query and generating a local partial closure of the data identified by the first query. The example method may further include synthesizing a data signature of the local partial closure. In this regard, the data signature may be an irreducible polynomial expression and the data signature may be orthogonal to remote data signatures generated from remote partial closures. Further, the example method may further include storing the data signature in an information store within a dynamic distributed device network.

An additional example embodiment of the present invention is an apparatus for determining data signatures. The example apparatus includes means for receiving a first query and means for generating a local partial closure of the data identified by the first query. The example apparatus may further include means for synthesizing a data signature of the local partial closure. In this regard, the data signature may be an irreducible polynomial expression and the data signature may be orthogonal to remote data signatures generated from remote partial closures. Further, the example apparatus may further include means for storing the data signature in an information store within a dynamic distributed device network.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
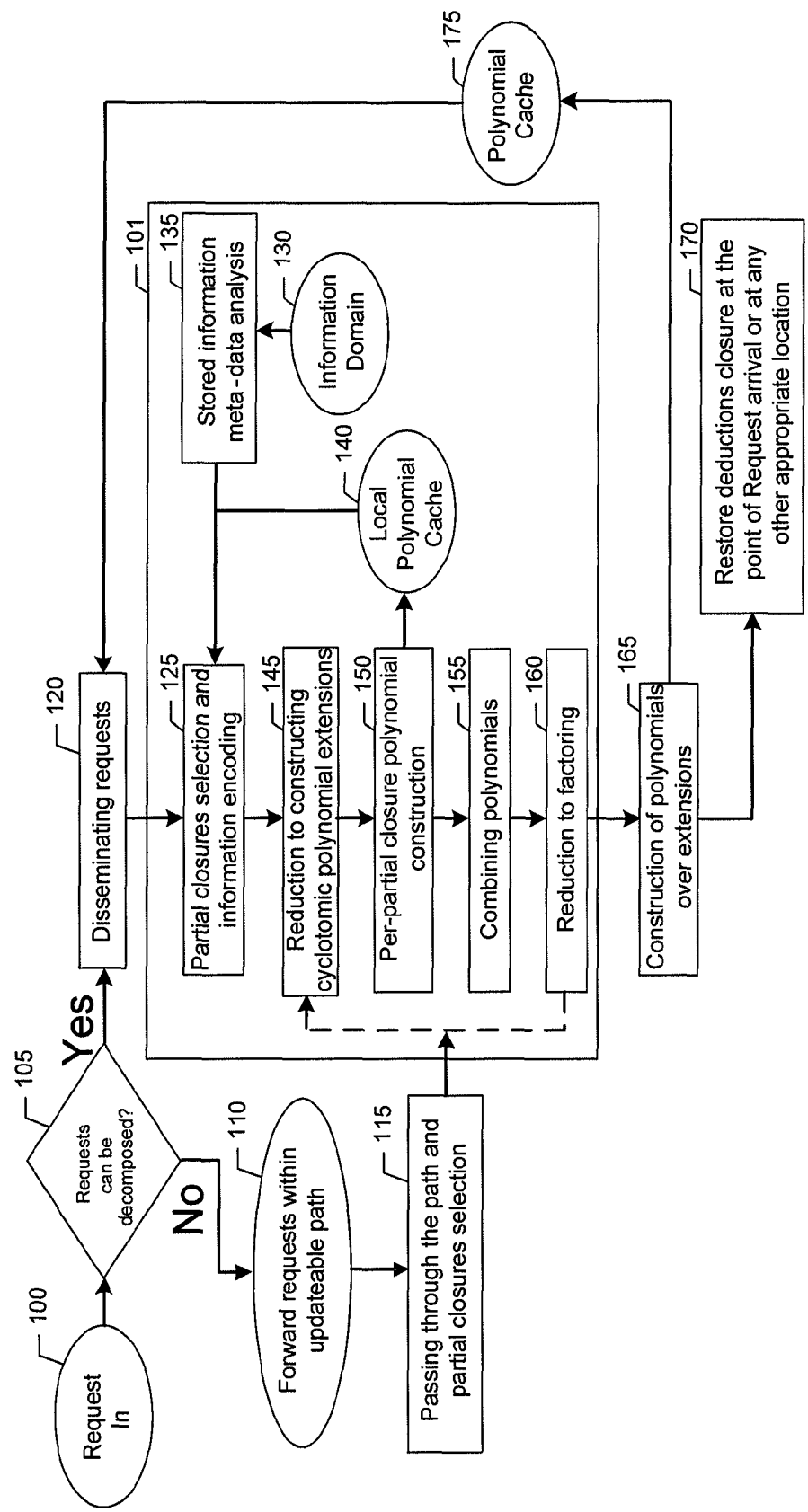
FIG. 1 is an illustration of flow chart of a method for determining data signatures in accordance with various example embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. As used herein, the terms "request," "message," and similar terms may be used interchangeably to refer to communications within a smart space in accordance with embodiments of the present invention. As used herein, the term "local," with respect to a device, refers to an aspect that is on or within the same device, and the term "remote," with respect to a device, refers to an aspect that is off the device and possibly on a separate device that may be accessed via a network. Further, as used herein, the term "message," and similar terms may be used interchangeably to refer to communications within a smart space in accordance with embodiments of the present invention. Moreover, the term "exemplary," as used herein, is not provided to convey any qualitative assessment, but instead to merely convey an illustration of an example.

The architecture of a smart space or other dynamic distributed device networks may be defined as a dynamic, ad hoc, distributed device network having a dynamic topology such that any device may leave or enter the network at any time. In some example embodiments, a smart space may include nodes and information stores.

Nodes may be the actors within the smart space, such as applications or other entities that request or otherwise interact with data, for example through the use of queries. In this regard, a node may be any application or portion of an application executed by a device connected to the smart space. A node may be aware of other nodes of the smart space, such as adjacent nodes. The application of a node may be any application that may implement storing, retrieving, computing, transmitting, and receiving information. In various embodiments, a node may be representative of applications being executed by various devices, such that in some exemplary embodiments, a node may be executed by the same device, or one device may execute a plurality of nodes. Further, in some embodiments, a single node may be implemented by more than one device such that the devices share the node.

A node may include an external interface, a node information store interface, and a task. The external interface may consider a node's interaction with the external world (e.g., a user). The node information store interface may be used to transfer information to and retrieve information from an information store via the smart space. The task may define a relationship between the external interface and the node information store interface. For example, if a user wishes to retrieve some information from an information store to a node, a task for the retrieval (e.g., a query message) may be generated. A node may interact with an information store in various manners. In this regard, a node may insert information, remove/retract information, query information, subscribe to an information store by means of the persistent query (e.g., a subscription), and cancel such subscriptions (e.g., unsubscribe). The various types of interactions between the nodes and the information stores may be collectively referred to as requests. A node may communicate the requests to the information store via the smart space, and receive information from the information store via the smart space. A node may be aware of the smart space generally, but need not be aware of the connectivity within the smart space.

Information stores of a smart space may be the passive entities within the smart space that store data. In this regard, information storage within the smart space may be considered free-form in nature, via a semantic, web style or space based information resources. Any device having writable memory and connected to a smart space may implement an information store. In this regard, the devices implementing an information store may be capable of storing, retrieving, computing, transmitting, and receiving information. Accordingly, in some embodiments, an information store may be a logical entity describing a location where information may be stored. According to various embodiments, an information store may span a plurality of devices. The information stores may store information associated with the smart space and information that may be accessed via the smart space.

Since information stores may be implemented by any device that is connected to the smart space, the data of the smart space may be distributed or dispersed within the smart space amongst the information stores. In this regard, data within the smart space may be acted upon by a dispersion algorithm. Any known dispersion algorithm may be utilized to disperse data (e.g., partial data closures, data signatures, etc.) amongst the information stores of a smart space.

In some example embodiments, the dispersion algorithm may also be used to decompose a data set into partial closures (also known as partial data closures) and the partial closure may be dispersed within the smart space. According to various example embodiments, the original data set, or a reliable prediction of the original data set, may be generated from two or more partial closures.

Embodiments of the present invention also provide for transforming or synthesizing partial closures into irreducible polynomial expressions of a desired degree, or data signatures, using a factoring algorithm or other mathematical techniques (e.g., cyclotomic polynomial extensions). In this regard, a query may be received that identifies data (e.g., local data) for generating a partial closure. These data signatures may be considered a relatively lighter version of the partial closures due to the data signatures being smaller in size than the respective partial closures. In some exemplary embodiments, the data signatures are smaller in size because redundant data is eliminated. The data signatures retain sufficient information so as to allow the data signatures to be used for querying functionality. The data signatures may be stored in the information stores of the smart space to facilitate satisfying subsequent queries.

Within an example smart space, various data signatures may be generated in response to a query or other triggering message. In this regard, a local partial closure may be generated. Also, remote data closures as well as remote data signatures, on other devices may be generated. As such, data signatures may reside on a plurality of devices within the smart space. According to various example embodiments, the data signatures may be generated in a manner that ensures orthogonality between at least some data signatures on other devices.

In this regard, the content of a query may be transformed using the same technique to generate a target signature. The target signature may be distributed throughout the smart space to facilitate the identification of data signatures that match the requested content of the query. Upon identifying appropriate data signatures, the data signatures may be directly combined to generate a deductive signature. In some example embodiments, the data signatures used in a synthesis operation are orthogonal to each other. The deductive signature may then be transformed, using for example, an access function or key, into a full closure of the data requested by the query. As such, example embodiments of the present invention allow for the target and data signatures to facilitate the reliable and consistent dynamic deduction of the result of a query of data within the smart space via partial, distributed information.

Accordingly, example embodiments of the present invention provide balance between computing closures in advance of a query versus defining an access function. Example embodiments can therefore dynamically, or in an on-demand fashion, generate query results. Further, the procedure of determining the query results may converge to mixed feedback/feed-forward computing of the information gain while balancing the various factors.

In this regard, to consider the current state of a word (e.g., a partial closure or data signature) at least three separate items of the information to be identified or consumed may be presented. The items may be observations pertaining to the current situation, generic knowledge about any similar situations, and beliefs regarding the non-directly observable features of the current situation. In case of the logical approaches, observations and generic knowledge may be encoded in some logic-based language. In probabilistic approaches, generic knowledge may be modeled by a probability distribution on the set of possible situations. Observations may result in the partial instantiation of some variables. Reasoning with respect to the data within a smart space may consist of inferring beliefs from observations, and generic knowledge that seems to be valid across a plurality of situations.

In logical approaches this reasoning may be achieved via logical deduction. In probability theory, the reasoning may follow from computing conditional probabilities of relevant propositions, where the conditioning event may gather the available observations. Observations may be reliable and non-conflicting, while computed beliefs may be, on the contrary, taken for granted. As a result, a strong similarity may exist between the logical and the probabilistic approaches to the reasoning. In some instances, confidence relationships between information compatible with deductive closure mechanisms may be substituted by a family of possibility relations. The family of possibility relations may characterize the same set of accepted beliefs. As a result, a reliable distributed deductive closure generation can be generated. The task of deductive closure decomposition may therefore converge to the task of searching and allocating a set of the facts (e.g., a data set) within a disjoint transitive closure generated by the nature of a smart space environment. As such, example embodiments of the present invention make use of non-decomposable components, or minimum components, that are sustained and useful for consideration and composition.

To consider the distributed deductive closure generation, the following assumption may be used. Following from decomposability criterion for elementary theories and partition-based logical reasoning for first-order and propositional theories, sets of facts (e.g., data sets) may be recognized as a decomposable deductive closure from the perspective of a corresponding signature. In some instances, this may be true if the deductive closure is in the form of predicate calculus of all sets of the facts of some partial closures with orthogonal signatures. Once joined or synthesized, the orthogonal signatures may produce a complete or deductive data signature.

In this regard, a set of facts (e.g., a data set within one or more information stores) may be represented by a triple form of the facts, namely a Subject-Predicate-Object representation, where the Predicate may be consistent and may thereby facilitate forming a necessary partial closure signature (e.g., data signature) that is orthogonal to any other partial closure signature. The Predicate may therefore shape the set of potential information by purpose and definition. Thus, an issue for distributed deductive closure generation may be to provide a complete or clustered image of the Predicates throughout all accessible information. To provide independence from the Predicates' consistency, some appropriate decomposable fragments in terms of signatures may be generated and identified.

Accordingly, in some example embodiments, there are two closures such that their associated signatures may be united to form the signature of a finite deductive closure for the particular information space. In this regard, if a fact (e.g., a subset of the set of facts) exists that is part of the signature of the finite deductive closure, then, according to various example embodiments, there exists at least two other facts (e.g., subsets of the set of facts), such that their corresponding signatures are orthogonal to the finite deductive closure signature.

Therefore, it follows that each fact (e.g., subset of the set of facts) of a finite deductive closure, which is not decomposable in that closure, contains Subject-Predicate-Object's only from one decomposition component of closure. Accordingly, the partitioning of the signature may be used, as well as components of closure, based at least in part on the system of rules (axioms) of closure.

Considering the signatures framework described above, a valid irreducible polynomial, with a corresponding key, may serve the role for the signatures creation and validation. Having orthogonality by definition of polynomial properties and taking the Predicate portion as a consistent representation of a partial closure within all accessible information, exemplary mechanisms for distributed deductive closure synthesis may be described.

With respect to the operation of the network (e.g., smart space), facts or data may be inserted or removed and queries may be inserted and/or satisfied. Facts and queries may be distributed or dispersed in a uniform or skewed/non-uniform fashion. Further, in some example embodiments, facts and queries may be encoded by means of some vector. As a result, facts and queries may be taken as input parameters of some predetermined polynomial form and an irreducible polynomial may be used as a dispersing mechanism.

Since irreducible polynomials may be created by means of a factoring algorithm, the resultant irreducible expression may be represented as the product of a desired number of distinct irreducible polynomials of a defined degree. As such, information transfer may be represented through an accumulated set of distinct irreducible polynomials, and information transfer can be translated into one or more irreducible polynomials. Thus, a most relevant first-order logic closure, which is a set of facts with redundancy, may be represented as a predetermined form of polynomial expression. As a result, the task of identifying the most common deductive closure, also known as the D kernel, may be reduced to the task of updating irreducible polynomial expressions representative of the D kernel. Deductive closure synthesis may therefore be an outcome of the updateable irreducible polynomial expressions.

Considering the task of irreducible polynomial updates, the process of deductive closure synthesis (facts closure generation) may play the role of the updating rule of the irreducible polynomial expressions. The updates may be conducted in an aggregated fashion and each update may be monitored and verified with respect to usefulness of the update. If it is determined that an update would not contribute useful information, the respective irreducible polynomial expression may be ignored as well as the associated facts.

Example embodiments also provide a feasible mechanism for shaping an image (e.g., a kernel image) of the deductive closure and for tracking and keeping the most relevant facts readily available. The mechanism can therefore track the most common or useful deductive closure and perform appropriate maintenance based on constraints of the smart space and the devices connected to the smart space. The deductive closure may therefore be assembled by means of the most useful pieces of the information, where the pieces of information may be structured and unstructured. The deductive closure may, as a result, be considered to be both static and dynamic.

FIG. 1 illustrates a method for facilitating distributed deductive closure synthesis according to example embodiments of the present invention. In this regard, at 100 requests may enter the network (e.g., dynamic distributed device network). The requests may be any type of message, such as, for example, a query or a request to store information. At 105, a determination may be as to whether the requests may be decomposed into component parts. If so, the request may be disseminated within the network at 120. If the request cannot be decomposed, the request may be forwarded within an updateable path 110. The non-decomposable requests may then be passed through a path within the network and a partial closures selection may be undertaken with respect to the requests at 115. The requests may then be acted upon by one or more individual devices of the network to transform the requests as indicated by the link to the single device perspective flow 101.

With respect to the decomposable requests, these requests may be disseminated at 120 and received by one or more devices of the network. Upon receipt, the request may enter the single device perspective flow 101. At 125, a partial closures selection and encoding of the requests may occur. In this regard, the information domain 130 may provide data through a stored information meta-data analysis process 135 for partial closure selection and information encoding at 125. The information domain 130 may be a representation of a data specific domain that provides meta-data, including actual content and query related content. Data specific information may be delivered by a distributed object file system infrastructure and may include meta-data object distribution and hierarchy.

Additionally, a local polynomial cache may provide data for partial closure selection and information coding. At 145, the requests and/or data received via the information domain 130 may be reduced by constructing, for example cyclotomic polynomial extensions. At 150, a per-partial closure polynomial may be constructed and stored in the polynomial local cache 140. The constructed polynomials may be combined at 155. The result may then be reduced via factoring, for example via a mathematical factoring algorithm. The series of operations 145 through 160 may occur at regular or irregular intervals in order to maintain the accuracy of the polynomial expressions relative to the data of the partial closures.

At 165, a construction of the polynomials over or with respect to the extensions (e.g., the cyclotomic polynomial extensions) may be performed. The results may be stored in a polynomial cache 175 for the network. In this regard, the content of the polynomial cache may be disseminated throughout the network at 120, for example, based on a dispersion algorithm. At 170, deductive closures may be restored at the point of the network that received the request or at another appropriate location.

Figure 2:
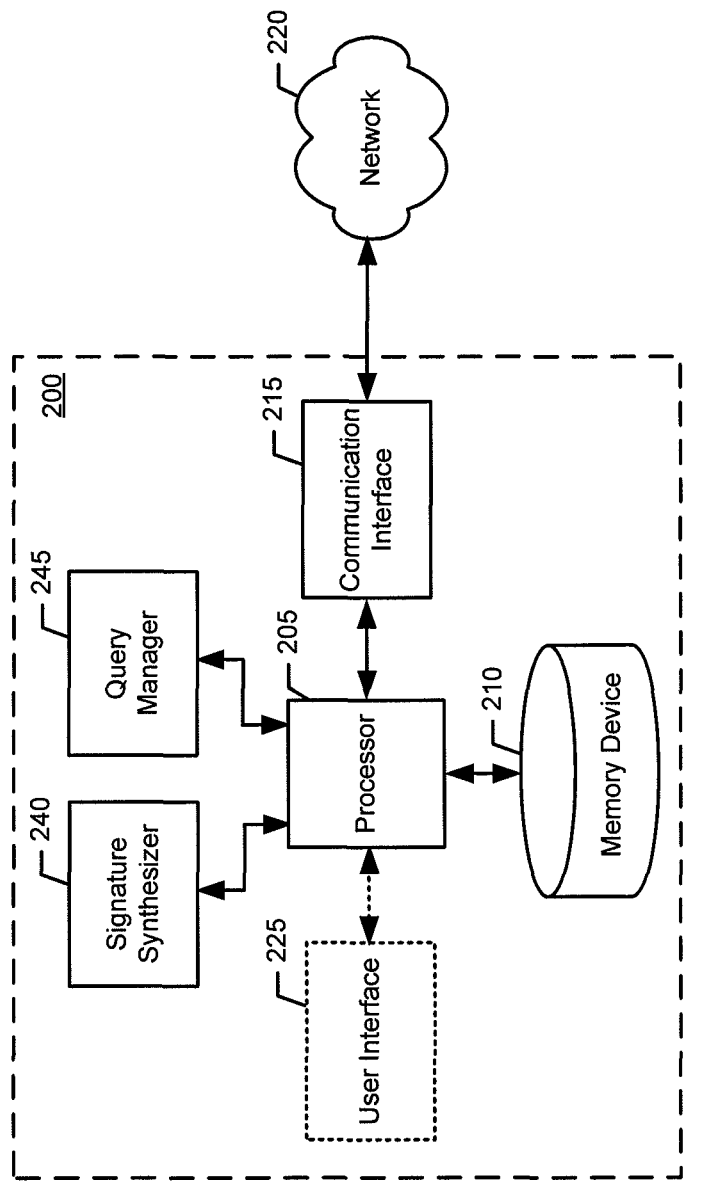
FIG. 2 is block diagram representation of an apparatus for determining and utilizing data signatures in a dynamic distributed device network according to various example embodiments of the present invention.

FIG. 2 illustrates an example apparatus 200 configured for distributed deductive closure synthesis in a dynamic distributed device network according to various embodiments of the present invention. The apparatus 200, and in particular the processor 205, may be configured to implement the operations and functionality described generally above, such as with respect to generation and dispersion of data signatures and the handling of a query for the retrieval of data. Further, the apparatus 200, and in particular the processor 205 may be configured to carry out some or all of the operations described with respect to FIGS. 1 and 3.

In some example embodiments, the apparatus 200 may be embodied as, or included as a component of, a computing device and/or a communications device with wired or wireless communications capabilities. Some examples of the apparatus 200 include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various example methods of the present invention, where the methods may be implemented by means of a hardware and/or software configured processor (e.g., processor 205), a computer-readable medium, or the like.

The apparatus 200 may include or otherwise be in communication with a processor 205, a memory device 210, and a communications interface 215. Further, in some embodiments, such as embodiments where the apparatus 200 is a mobile terminal, the apparatus 200 also includes a user interface 225. The processor 205 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. With respect to the processor being an FPGA, ASIC, or the like, the processor may be specifically hardware configured to perform the operations of the processor 205 as described herein. In an example embodiment, the processor 205 is configured to execute instructions stored in the memory device 210 or instructions otherwise accessible to the processor 205. Processor 205 may be configured to facilitate communications via the communications interface 215 by, for example, controlling hardware and/or software included in the communications interface 215.

The memory device 210 may be configured to store various information involved in implementing embodiments of the present invention such as, for example, target and data signatures. The memory device 210 may be a computer-readable storage medium that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The user interface 225 may be in communication with the processor 205 to receive user input at the user interface 225 and/or to provide output to a user as, for example, audible, visual, mechanical or other output indications. The user interface 225 may include, for example, a keyboard, a mouse, a joystick, a display (e.g., a touch screen display), a microphone, a speaker, or other input/output mechanisms. In some example embodiments, the display of the user interface 225 may be configured to present results of a query performed in accordance with embodiments of the present invention.

The communication interface 215 may be any device or means embodied in either hardware, a computer program product, or a combination of hardware and software that is configured to receive and/or transmit data from/to a network and/or any other device or module in communication with the apparatus 200. In this regard, the communication interface 215 may include, for example, an antenna, a transmitter, a receiver, a transceiver and/or supporting hardware, including a processor or a computer program product for enabling communications with network 220. In this regard, network 220 may be a smart space or other dynamic distributed device network. Apparatus 200 may be one of many devices that are part of a dynamic distributed device network (e.g., network 220) defined as a network where devices leave or enter the network at any time. In some example embodiments, network 220 may exemplify a peer-to-peer connection. Via the communication interface 215, the apparatus 200 may communicate with various other network entities.

The communications interface 215 may be configured to provide for communications in accordance with any wired or wireless communication standard. For example, communications interface 215 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The signature synthesizer 240 and the query manager 245 of apparatus 200 may be any means or device embodied in hardware, a computer program product, or a combination of hardware and software, such as processor 205 implementing software instructions or a hardware configured processor 205, that is configured to carry out the functions of the signature synthesizer 240 and/or the query manager 245 as described herein. In an example embodiment, the processor 205 may include, or otherwise control the signature synthesizer 240 and/or the query manager 245. In various example embodiments, the signature synthesizer 240 and/or the query manager 245 may reside on differing apparatuses such that some or all of the functionality of the signature synthesizer 240 and/or the query manager 245 may be performed by a first apparatus, and the remainder of the functionality of the signature synthesizer 240 and/or the query manager 245 may be performed by one or more other apparatuses.

The signature synthesizer 240 may be configured to receive a query and generate a local partial closure of the data identified by the query. The signature synthesizer 240 may also be configured to synthesize a data signature of the local partial closure via, for example, cyclotomic polynomial extensions. In this regard, the data signature may be an irreducible polynomial expression. Further, the data signature may be orthogonal to remote data signatures generated from remote partial closures. In some example embodiments, the remote data signatures may be generated on other, remote devices and/or processors that are part of a dynamic distributed device network. The signature synthesizer 204 may also be configured to store the data signature in an information store (e.g., the memory device 210) within the dynamic distributed device network. In some example embodiments, the signature synthesizer 240 may be further configured to re-synthesize the data signature regularly, irregularly, and/or in response to, for example, changes in the data identified by the query or changes in the topology of the network. The signature synthesizer 240 may be therefore configured to maintain and update data signatures in preparation for subsequent queries.

The query manager 245 may be configured to handle queries of data and the retrieval of query results. In this regard, query manager 245 may be configured to receive a query from, for example, a node implemented on a device connected to network 220. The query manager 245 may be further configured to generate a target signature based on the query. In some example embodiments, the target signature may be a transformation of the query into an irreducible polynomial expression form.

The query manager 245 may also be configured to locate at least a first and a second data signature based on the target signature within a dynamic distributed device network. In this regard, in some example embodiments, the query manager 245 is configured to transmit the target signature to a plurality of processors. The processors may be embodied as or included with devices that are part of the dynamic distributed device network. A processor in receipt of the target signature (e.g., processor 205) may be configured to compare the target signature to data signatures within an information store accessible to the processors to identify a match. In this regard, the data signatures may be dispersed within the dynamic distributed device network. The dispersion of the data signatures may be based on a dispersion algorithm that provides a uniform dispersion of data signatures and/or underlying data (e.g., partial closures) or a non-uniform/skewed dispersion of data signatures. Further, the query manager 245 may be configured to receive data signatures (e.g., a first and at least a second data signature) from at least one of the plurality of processors within the dynamic distributed device network. In some example embodiments, the query manager 245 may receive one or more data signatures from an information store accessible by the apparatus 200, such as an information store implemented on memory device 210.

The data signatures located by the query manager 245 may be irreducible polynomial expressions. The data signatures may have been generated by transforming or reducing the data of partial data closures into irreducible polynomial expressions via, for example, cyclotomic polynomial extensions. The query manager 245 may also be configured to combine at least two data signatures (e.g., a first data signature and a second data signature) to generate a deductive data signature. The deductive data signature may be a representation of a full data closure. The query manager 245 may be further configured to combine data signatures that are orthogonal to each other (e.g., a first data signature that is orthogonal to a second data signature). In various example embodiments, the query manager 245 is also configured to transform the deductive data signature into a full data closure to satisfy a query.

Figure 3:
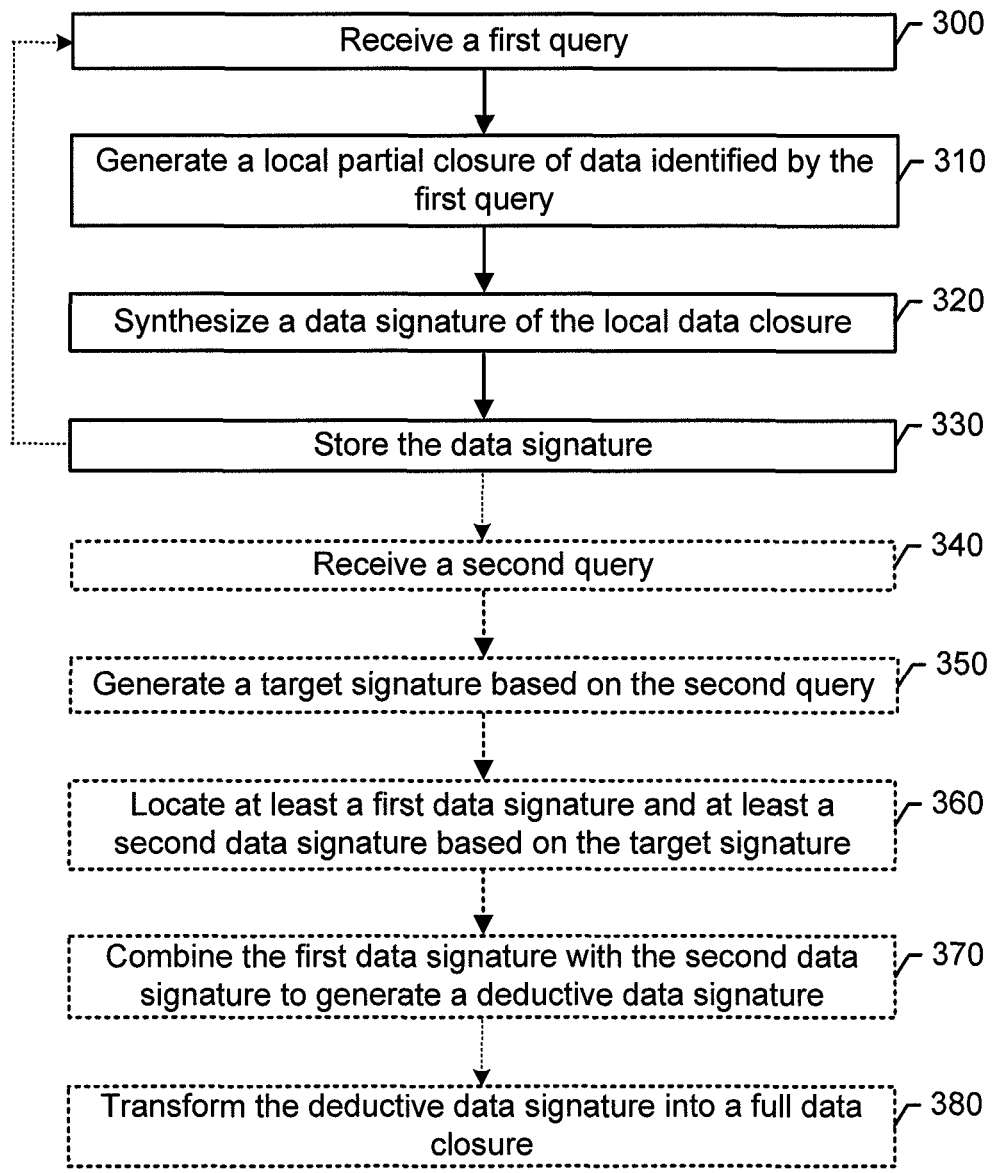
FIG. 3 is a flowchart of a method for determining and utilizing data signatures according to various example embodiments of the present invention.

FIG. 3 and FIG. 1, described above, illustrate flowcharts of a system, method, and computer program product according to example embodiments of the invention. It will be understood that each block, step, or operation of the flowcharts, and/or combinations of blocks, steps, or operations in the flowcharts, may be implemented by various means. Example means for implementing the blocks, steps, or operations of the flowcharts, and/or combinations of the blocks, steps or operations in the flowcharts include hardware, firmware, and/or computer program product including a memory device storing one or more computer program code instructions, program instructions, or executable computer-readable program code instructions. Example means for implementing the blocks, steps, or operations of the flowcharts, and/or combinations of the blocks, steps or operations in the flowchart also include a processor such as the processor 205. The processor may, for example, be configured to perform the operations of FIG. 1 and/or the operations of FIG. 3 by performing hardware implemented logical functions, executing stored instructions, or executing algorithms for performing each of the operations. Alternatively, an example apparatus may comprise means for performing each of the operations of the flowcharts. In this regard, according to an example embodiment, examples of means for performing the operations of FIG. 1 and/or the operations of FIG. 3 include, for example, the processor 205 such as the processor executing an algorithm for processing information as described above, the signature synthesizer 240 and/or the query manager 245.

In one example embodiment, one or more of the procedures described herein are embodied by a computer program product including program code instructions. In this regard, the program code instructions which embody the procedures described herein may be stored by or on a memory device, such as memory device 210, of an apparatus, such as apparatus 200, and executed by a processor, such as the processor 205. As will be appreciated, any such program code instructions may be loaded onto a computer, processor, or other programmable apparatus (e.g., processor 205, memory device 210) to produce a machine which, in turn, includes means for implementing the functions specified in the flowcharts' block(s), step(s), or operation(s). In some example embodiments, these program code instructions are also stored in a computer-readable storage medium that directs a computer, a processor, or other programmable apparatus to function in a particular manner, such that the instructions stored in the computer-readable storage medium produce an article of manufacture which also provides means which implement the function specified in the flowcharts' block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block (s), step(s), or operation(s).

Accordingly, blocks, steps, or operations of the flowcharts support combinations of means for performing the specified functions, combinations of steps for performing the specified functions, and program code instructions for performing the specified functions. It will also be understood that, in some example embodiments, one or more blocks, steps, or operations of the flowcharts, and combinations of blocks, steps, or operations in the flowcharts, are implemented by special purpose hardware-based computer systems or processors which perform the specified functions or steps, or combinations of special purpose hardware and program code instructions.

FIG. 3 depicts a flowchart describing an example method for determining data signatures in a dynamic distributed device network. According to various example embodiments, the operations of FIG. 3 are performed by the processor 205, which is specifically configured to perform the operations of FIG. 3.

At 300, the example method includes receiving a first query and, at 310, generating a local partial closure of data identified by the first query. At 320, a data signature may be synthesized from the local data closure. In some example embodiments, the data signature may be synthesized through the use of cyclotomic polynomial extensions. The data signature may be an irreducible polynomial expression and the data signature may be orthogonal to one or more remote data signatures generated from remote partial closures. Further, the example method may include storing the data signature in an information store within a dynamic distributed device network. At 330, the example method may begin again at 300 or subsequent to 300, such as at 320, so as to re-synthesize or update the data signature based on, for example, changes in the data or changes in the topology of the network.

As part of a query procedure to retrieve a data set, the example method of FIG. 3, according to some example embodiments, also includes receiving a second query at 340 and generating a target signature based on the query at 350. At 360, the example method includes locating at least a first data signature and a second data signature based on the target signature. In this regard, the first and second data signatures may be irreducible polynomial expressions. The irreducible polynomial expressions may have been generated by synthesizing respective partial data closures. For example, in some example embodiments, the partial data closures are synthesized via cyclotomic polynomial extensions to generate the irreducible polynomial expressions, or data signatures. In some example embodiments, locating data signatures may include locating data signatures that have been dispersed in a dynamic distributed device network in accordance with a uniform or skewed/non-uniform dispersion algorithm. Further, locating data signatures may include transmitting the target signature to a plurality of processors within a dynamic distributed device network and/or receiving data signatures from one of the plurality of processors within a dynamic distributed device network.

At 370, the example method further comprises combining a first data signature with a second data signature to generate a deductive data signature. The deductive data signature may be a representation of a full data closure. In this regard, in some example embodiments, the method further includes transforming the deductive data signature into a full data closure at 380 to satisfy a query.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising a processor, the processor configured to:
   receive a first query;
   generate a local partial closure of data identified by the first query;
   synthesize a data signature of the local partial closure, the data signature being an irreducible polynomial expression, and the data signature being orthogonal to remote data signatures generated from remote partial closures; and
   store the data signature in an information store within a dynamic distributed device network.

2. The apparatus of claim 1, wherein the processor configured to synthesize the data signature includes being configured to synthesize the data signature via cyclotomic polynomial extensions.

3. The apparatus of claim 1, wherein the processor is further configured to re-synthesize the data signature in response to changes in the data identified by the first query.

4. The apparatus of claim 1, wherein the processor is further configured to: receive a second query; generate a target signature based on the second query; locate at least a first data signature and a second data signature based on the target signature, the first data signature being orthogonal to the second data signature; and combine the first data signature with the second data signature to generate a deductive data signature, the deductive data signature being a representation of a full data closure.

5. The apparatus of claim 4, wherein the processor is further configured to transform the deductive data signature into a full data closure to satisfy the second query.

6. The apparatus of claim 4, wherein the processor configured to locate the first data signature and the second data signature includes being configured to receive the first data signature from one of a plurality of processors within a dynamic distributed device network.

7. The apparatus of claim 1 further comprising a memory device, the memory device storing computer-readable program code instructions accessible to the processor for configuring the processor.

8. The apparatus of claim 1, wherein the apparatus comprises a mobile terminal.

9. A computer program product comprising at least one computer-readable storage medium having executable computer-readable program code instructions stored therein, the computer-readable program code instructions configured to:
 receive a first query;
 generate a local partial closure of data identified by the first query;
 synthesize a data signature of the local partial closure, the data signature being an irreducible polynomial expression, and the data signature being orthogonal to remote data signatures generated from remote partial closures; and
 store the data signature in an information store within a dynamic distributed device network.

10. The computer program product of claim 9, wherein the computer-readable program code instructions configured to synthesize the data signature include being configured to synthesize the data signature via cyclotomic polynomial extensions.

11. The computer program product of claim 9, wherein the computer-readable program code instructions are further configured to re-synthesize the data signature in response to changes in the data identified by the first query.

12. The computer program product of claim 9, wherein the computer-readable program code instructions are further configured to:
 receive a second query;
 generate a target signature based on the second query;
 locate at least a first data signature and a second data signature based on the target signature, the first data signature being orthogonal to the second data signature; and
 combine the first data signature with the second data signature to generate a deductive data signature, the deductive data signature being a representation of a full data closure.

13. The computer program product of claim 12, wherein the computer-readable program code instructions are further configured to transform the deductive data signature into a full data closure to satisfy the second query.

14. A method comprising:
 receiving a first query;
 generating a local partial closure of data identified by the first query;
 synthesizing, via a processor, a data signature of the local partial closure, the data signature being an irreducible polynomial expression, and the data signature being orthogonal to remote data signatures generated from remote partial closures; and
 storing the data signature in an information store within a dynamic distributed device network.

15. The method of claim 14, wherein synthesizing the data signature includes synthesizing the data signature via cyclotomic polynomial extensions.

16. The method of claim 14 further comprising re-synthesizing the data signature in response to changes in the data identified by the first query.

17. The method of claim 14 further comprising:
 receiving a second query;
 generating a target signature based on the second query;
 locating at least a first data signature and a second data signature based on the target signature, the first data signature being orthogonal to the second data signature; and
 combining the first data signature with the second data signature to generate a deductive data signature, the deductive data signature being a representation of a full data closure.

18. The method of claim 17 further comprising transforming the deductive data signature into a full data closure to satisfy the second query.

19. An apparatus comprising:
 means for receiving a first query; means for generating a local partial closure of data identified by the first query;
 means for synthesizing a data signature of the local partial closure, the data signature being an irreducible polynomial expression, and the data signature being orthogonal to remote data signatures generated from remote partial closures; and
 means for storing the data signature in an information store within a dynamic distributed device network.

20. The apparatus of claim 19, further comprising:
 means for receiving a second query;
 means for generating a target signature based on the second query;
 means for locating at least a first data signature and a second data signature based on the target signature, the first data signature being orthogonal to the second data signature; and
 means for combining the first data signature with the second data signature to generate a deductive data signature, the deductive data signature being a representation of a full data closure.

* * * * *